United States Patent
Usoro

(10) Patent No.: US 7,748,483 B2
(45) Date of Patent: Jul. 6, 2010

(54) ACCESSORY DRIVE SYSTEM AND METHOD FOR A PARALLEL ELECTRIC HYBRID VEHICLE

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 632 days.

(21) Appl. No.: 11/372,919

(22) Filed: Mar. 10, 2006

(65) Prior Publication Data

US 2007/0209849 A1    Sep. 13, 2007

(51) Int. Cl.
*B60W 20/00* (2006.01)
(52) U.S. Cl. ............... 180/65.27; 180/53.8; 180/65.28
(58) Field of Classification Search ............... 180/65.2, 180/65.3, 65.4, 53.8; 903/948
See application file for complete search history.

(56) References Cited

U.S. PATENT DOCUMENTS

| | | | | |
|---|---|---|---|---|
| 4,489,242 A * | 12/1984 | Worst | | 307/10.1 |
| 5,558,173 A * | 9/1996 | Sherman | | 180/53.8 |
| 5,635,805 A * | 6/1997 | Ibaraki et al. | | 318/139 |
| 6,208,036 B1 | 3/2001 | Evans et al. | | 290/46 |
| 6,223,844 B1 * | 5/2001 | Greenhill et al. | | 180/65.3 |
| 6,251,042 B1 | 6/2001 | Peterson et al. | | 477/3 |
| 6,501,190 B1 * | 12/2002 | Seguchi et al. | | 290/46 |
| 6,524,218 B1 * | 2/2003 | Yamada et al. | | 477/5 |
| 6,796,367 B2 * | 9/2004 | Blacquiere et al. | | 165/41 |
| 6,801,842 B2 * | 10/2004 | Egami et al. | | 701/36 |
| 6,863,139 B2 * | 3/2005 | Egami et al. | | 180/53.8 |
| 7,119,454 B1 * | 10/2006 | Chiao | | 307/9.1 |
| 7,174,977 B2 * | 2/2007 | Enjoji et al. | | 180/65.1 |
| 2003/0116368 A1 * | 6/2003 | Winkelman et al. | | 180/65.2 |
| 2007/0080008 A1 * | 4/2007 | Chiao | | 180/65.3 |
| 2007/0103002 A1 * | 5/2007 | Chiao et al. | | 307/10.1 |
| 2007/0213151 A1 * | 9/2007 | Usoro | | 474/87 |
| 2008/0051242 A1 * | 2/2008 | Usoro | | 475/5 |

\* cited by examiner

*Primary Examiner*—Jeffrey J Restifo
(74) *Attorney, Agent, or Firm*—Quinn Law Group, PLLC

(57) ABSTRACT

The present invention provides an accessory drive system for a parallel electric hybrid vehicle. The apparatus includes an engine and a motor/generator independently connectable to a transmission. At least one torque-transmitting device selectably connects an engine and a motor/generator with a transmission. A drive pulley is connected to an output shaft of the engine. A plurality of driven pulleys are each connected to an accessory. A drive belt connectively couples the drive pulley and the plurality of driven pulleys, and is operable to transfer drive forces between the drive pulley and the plurality of driven pulleys. A controller is operatively connected to the torque-transmitting device, the engine and the motor/generator, and is configured to control the torque-transmitting device, the engine and the motor/generator to ensure the plurality of accessories are adequately powered.

15 Claims, 1 Drawing Sheet

ACCESSORY DRIVE SYSTEM AND METHOD FOR A PARALLEL ELECTRIC HYBRID VEHICLE

TECHNICAL FIELD

The present invention pertains generally to a method and apparatus for driving accessories on a parallel electric hybrid vehicle.

BACKGROUND OF THE INVENTION

The accessories in a conventional motor vehicle are powered by output from the engine. A hybrid electro-mechanical vehicle generally includes both an internal combustion engine and one or more electric motor/generators. Some of the accessories in a hybrid vehicle may require power while the engine is off and the vehicle is being powered by the electric motor/generator. Traditionally, in order to power hybrid vehicle accessories when the engine is off, it was necessary to provide each such accessory with a separate electric motor.

The typical automotive accessory drive system consists of a drive pulley connected to an output shaft of the engine, typically the crankshaft. Wrapped around this pulley is a flexible drive belt, which in turn is wrapped around a plurality of driven pulleys. This flexible drive belt transmits drive forces between the drive pulley and the driven pulleys. The driven pulleys may be fixably attached to accessories known in the art such as a power steering pump, air conditioning compressor, alternator, and water pump.

A parallel electric hybrid vehicle includes a transmission adapted to receive the output power from either an engine or an electric motor, or both. Additionally, in a parallel electric hybrid vehicle the power supplied by the engine and the power supplied by the source of electrical energy are independently connected to the transmission thereby forming a "parallel" type connection.

SUMMARY OF THE INVENTION

The apparatus and method of the present invention provide an accessory drive system for a parallel electric hybrid vehicle. The apparatus includes at least one torque-transmitting device selectably connecting an engine and a motor/generator with a transmission. A drive pulley is connected to an output shaft of the engine. A plurality of driven pulleys are each connected to one of a plurality of accessories. A drive belt connectively couples the drive pulley and the plurality of driven pulleys, and is operable to transfer drive forces between the drive pulley and the plurality of driven pulleys. A controller is operatively connected to the torque-transmitting device, the engine and the motor/generator, and is configured to control the torque-transmitting device, the engine and the motor/generator to ensure the plurality of accessories are adequately powered.

The method of the present invention allows the accessories to be driven by power from the engine or the motor-generator under all vehicle operating conditions without the need for individual accessory electric drive motors, as is often practiced, by requiring that the hybrid powertrain be operated to maintain a minimum input (engine) speed even when fuel to the engine is shut off and/or the vehicle is stopped. Energy is transferred either from the engine or the motor/generator to the plurality of accessories. The engine, motor/generator and torque transmitting devices are controlled, such as with an electronic controller, to ensure each of the accessories receive enough energy to remain fully operational.

According to one aspect of the invention, the apparatus includes a storage device such as a battery operatively connected to the motor/generator, the storage device being configured to store energy from the motor/generator when excess power is being produced by the engine or power is being recuperated from braking.

According to another aspect of the invention, the method includes establishing a predefined minimum engine speed at which all of the accessories remain fully operational.

According to yet another aspect of the invention, the hybrid powertrain is controlled to ensure that the input speed (therefore the engine crankshaft speed and accessory drive pulley speed) is not operated below the predefined minimum engine speed when the vehicle is in operation, including when fuel is cut off to the engine to reduce fuel consumption.

According to still another aspect of the invention, for engines equipped with variable valve actuation, the method includes appropriately manipulating the intake and exhaust valves (for example, keeping both intake and exhaust valves closed) when fuel to the engine is shut off and the accessories are being driven by power from the motor-generator through the engine crankshaft, in order to reduce rotational resistance and pumping losses, and so improve the efficiency of the accessory drive system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
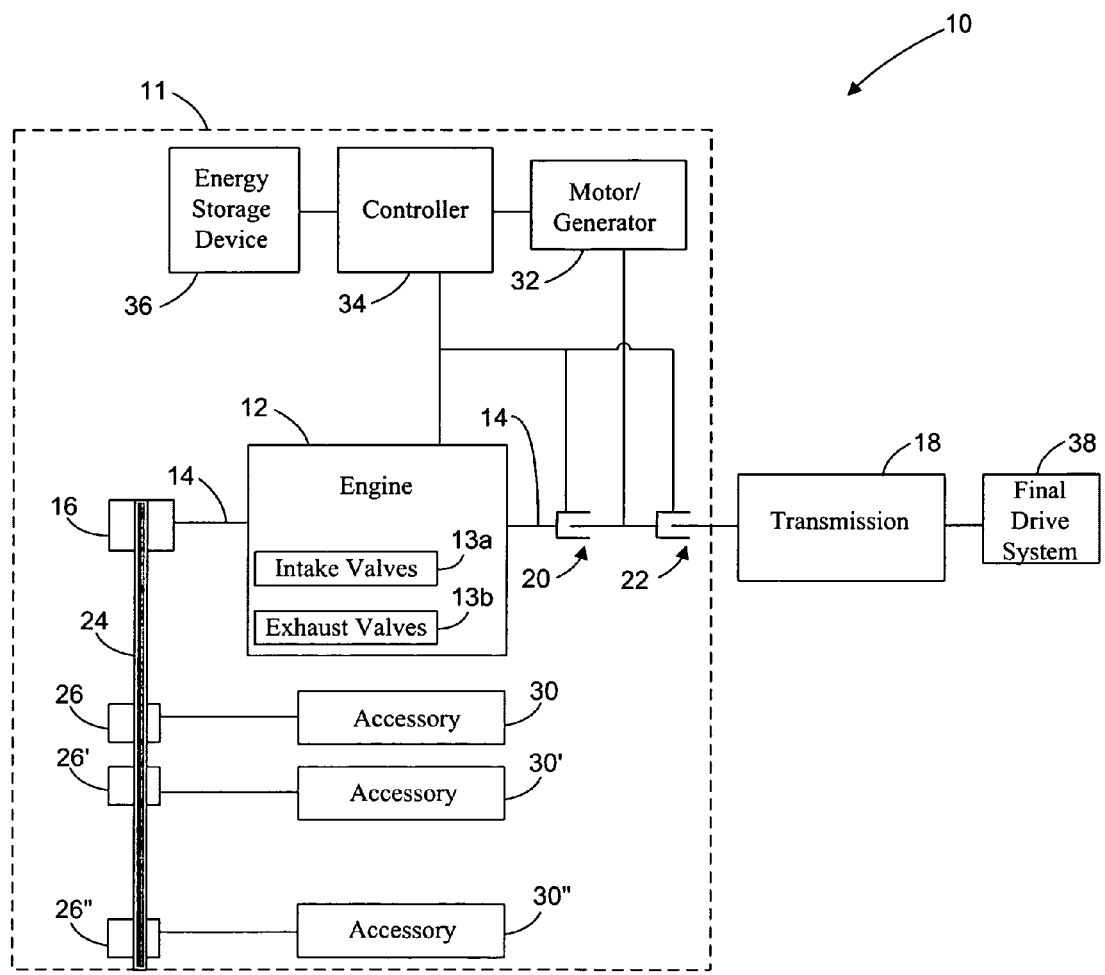
FIG. 1 is a schematic diagram of an accessory drive system for a parallel electric hybrid vehicle in accordance with the present invention.

Referring to the drawings, wherein like reference numbers refer to like components, FIG. 1 shows a schematic representation of a parallel electric hybrid powertrain 10 having an accessory drive system 11. The parallel electric hybrid powertrain 10 includes an engine 12 configured to transmit output to a drive pulley 16 and/or to a transmission 18. The engine is connected to and controlled by a controller 34. The drive pulley 16 is operatively connected to the crank shaft or output shaft 14. The parallel electric hybrid powertrain 10 also includes a motor/generator 32 selectively connectable to the engine 12 and/or the transmission 18. The controller 34 may be configured to include a hybrid control module, engine control module, transmission control module, motor-generator control modules and necessary electronic drives or power electronics circuits. The controller 34 is connected to the motor generator 32, and to an energy storage device 36. The storage device 36 is adapted to store energy from the motor/generator 32 when the engine 12 is producing excess power or when vehicle braking power is being recuperated. According to a preferred embodiment, the storage device 36 is a battery; however, alternate storage devices may be envisioned. The transmission 18 is operatively connected to a final drive system 38.

As is known in the art, the parallel electric hybrid vehicle is so named because the engine 12 and the motor/generator 32 form a parallel type connection with the transmission 18. In other words, the power supplied by the engine 12 and the power supplied by the motor/generator 32 are independently connected to the transmission 18. For purposes of this disclosure, the engine 12 and the motor/generator 32 are considered to be independently connected to the transmission 18 because power from the engine 12 does not pass through the motor/generator 32 on the way to the transmission 18, and power from the motor/generator 32 does not pass through the engine 12 on the way to the transmission 18.

A first clutch 20 is disposed between the motor/generator 32 and the engine 12, and a second clutch 22 is disposed between the motor/generator 32 and the transmission 18. The clutches 20, 22 are operatively connected to and controlled by the controller 34. The clutches 20, 22 are configured to operatively couple or de-couple the engine 12, the motor/generator 32, and the transmission 18 such that power is selectively transferable therebetween. It should be appreciated that the clutches 20, 22 may, alternatively, be replaced by any selectively engageable torque transmitting device.

The drive pulley 16 is connected to a plurality of driven pulleys 26, 26', and 26" via a drive belt 24. Each of the driven pulleys 26, 26', 26" are connected to one of a plurality of accessories 30, 30', 30", respectively, such that the rotation of the driven pulleys 26, 26', 26" transfers power to drive the accessories 30, 30', 30" connected thereto. The accessories 30, 30', 30" may include, for example, a power steering pump, a water pump, an alternator, or an air conditioning compressor.

Power from the engine 12 is transferable through the output shaft 14, through the drive pulley 16, through the drive belt 24, and through the driven pulleys 26, 26', 26" to power the accessories 30, 30', 30". Alternatively, when clutch 20 is engaged, power from the motor/generator 32 is transferable through the clutch 20, through the engine output shaft 14, through the drive pulley 16, through the drive belt 24, and through the driven pulleys 26, 26', 26" to power the accessories 30, 30', 30". In order to power the accessories of a hybrid vehicle when the engine is off, it was conventionally necessary to provide a separate electric motor for each such accessory. Therefore, by controlling the motor/generator 32 to power all of the accessories 30, 30', 30" when the engine 12 is off, the present invention saves the cost associated with manufacturing and installing the plurality of electric motors otherwise required to power the accessories 30, 30', 30".

The accessories 30, 30', 30" must each be driven above a predefined minimum speed in order to remain fully operational. Therefore, according to a preferred embodiment, the present invention establishes a predetermined minimum engine speed $V_m$ calculated to ensure the accessories 30, 30', 30" are adequately powered and remain operational. For purposes of the present invention, the accessories 30, 30', 30" are "adequately powered" when they receive enough power to remain fully operational, and "engine speed" is defined as the rotational speed of the crankshaft 14 measured using a conventional speed sensor (not shown) attached thereto. It should be appreciated that while engine speed is preferably monitored and controlled to ensure the accessories 30, 30', 30" are adequately powered, alternate embodiments may monitor and control other characteristics of the accessory drive system 11 such as, for example, the rotational speed of one or more of the pulleys 16, 26, 26', 26" and/or the drive belt 24.

Under operating conditions wherein the engine 12 is fueled and running normally, the accessories 30, 30', and 30" are driven by power from the engine 12, just as in conventional vehicles.

Under operating conditions that normally call for the engine 12 of the hybrid vehicle to be shut down, the controller 34 shuts off the transfer of fuel to the engine 12, controls the clutch 20 to engage fully or partially as necessary, and commands the motor/generator 32 to operate to power the accessories 30, 30', 30". More precisely, when the transfer of fuel is shut off, the controller 34 commands the motor/generator 32 to transmit power through the clutch 20, the engine crankshaft 14, the drive pulley 16, the drive belt 24, the driven pulleys 26, 26', 26", and to the accessories 30, 30', 30". This method ensures that the accessories 30, 30', and 30" remain operational under operating conditions that call for engine fuel cut-off, without the need for individual electric accessory drives. As the motor/generator 32 transfers power to the accessories 30, 30', 30" through the engine crankshaft 14, the engine crankshaft 14 is serving as a torque/power transmitting device. For engines equipped with variable valve actuation, the controller 34 can appropriately manipulate the intake valves 13a and exhaust valves 13b (for example, but not limited to, keeping both the intake valves 13a and the exhaust valves 13b closed) when fuel to the engine 12 is shut off and the accessories 30, 30', 30" are being driven by power from the motor-generator 32 through the engine crankshaft 14, in order to reduce crankshaft rotational resistance and engine pumping losses, and thereby improve the efficiency of the accessory drive system 11.

If the engine 12 is shut down and the vehicle is decelerating to a stop, the clutch 22 can be disengaged to de-couple the motor/generator 32 from the transmission 18. Thereafter, the controller 34 can command the motor/generator 32 to transfer additional power to maintain the engine crankshaft speed above the predetermined minimum value $V_m$ such that the accessories 30, 30', 30" remain fully operational without affecting vehicle performance. If, however, the vehicle is being powered by the motor/generator 32, the clutches 20 and 22 must be suitably controlled by the controller 34 to be fully or partially engaged, and the motor/generator 32 is controlled by the controller 34 to provide adequate power to run the accessories as well as meet driver demands pertaining to vehicle output. In other words, the accessories are powered to remain fully operational without sacrificing vehicle output demands such as, for example, vehicle speed and acceleration demands.

While the preferred embodiment of the accessory drive system 11 has been described hereinabove as including two clutches 20 and 22, an alternate embodiment without clutch 20 may be envisioned such that only a single clutch 22 is implemented. According to the alternate embodiment, the motor generator 32 is directly connected to the engine crankshaft 14, and is indirectly connectable to the transmission 18 via the clutch 22.

The alternate embodiment wherein the accessory drive system 11 includes a single clutch 22 functions similarly to the preferred embodiment described hereinabove under operating conditions wherein the engine 12 is fueled and running normally. Under operating conditions that normally call for the engine 12 of the hybrid vehicle to be shut down, the controller 34 shuts off the transfer of fuel to the engine 12, controls the clutch 22 to engage fully or partially as necessary, and commands the motor/generator 32 to operate to power the accessories 30, 30', 30". If the engine 12 is shut down and the vehicle is decelerating to a stop, the clutch 22 can be disengaged to de-couple the motor/generator 32 from the transmission 18 and the controller 34 can command the motor/generator 32 to transfer additional power to maintain the engine crankshaft speed above the predetermined minimum value $V_m$ such that the accessories 30, 30', 30" remain fully operational without affecting vehicle performance.

A method for driving the accessories on a parallel electric hybrid vehicle includes the following. Energy from the engine 12 and/or the motor/generator 32 is transferred to the accessories 30, 30', 30" via the drive belt 24. As energy is transferred to the accessories 30, 30', 30", the engine 12 and/or the motor/generator 32 are controlled, such as by the controller 34, to ensure the engine speed exceeds the predetermined minimum value $V_m$ and the accessories 30, 30', 30" remain fully operational. This may be accomplished, for example, by increasing the output of the engine 12 and/or the motor/generator 32 as required to adequately power the accessories 30, 30', 30" while meeting driver demands.

While the best modes for carrying out the invention have been described in detail, those familiar with the art to which this invention relates will recognize various alternative designs and embodiments for practicing the invention within the scope of the appended claims.

The invention claimed is:

1. An accessory drive system for a hybrid electric vehicle comprising:
    an engine including a plurality of intake valves, a plurality of exhaust valves, and a crankshaft;
    a motor/generator independently connectable to a transmission;
    a selectively engageable torque transmitting device disposed between the engine and the transmission, wherein said torque transmitting device is disengageable to de-couple the engine and the motor/generator from the transmission;
    a drive pulley connected to the engine;
    a driven pulley connected to an accessory;
    a drive belt operatively connecting said drive pulley and said driven pulley and operable to transfer drive forces between said drive pulley and said driven pulley;
    a controller operatively connected to the torque-transmitting device, the engine and the motor/generator, said controller configured to control the torque-transmitting device, the engine and the motor/generator to ensure that the accessory is sufficiently powered to remain fully operational by the engine when the engine is running or by said motor/generator when the engine is not running; and
    wherein the controller is configurable to manipulate the intake valves and the exhaust valves when the accessory is being driven by power from the motor/generator through the engine crankshaft, in order to reduce crankshaft rotational resistance and engine pumping losses, and thereby improve the efficiency of the accessory drive system.

2. The accessory drive system of claim 1, further comprising a storage device operatively connected to the motor/generator, said storage device being configured to store energy from the motor/generator when the engine is producing excess power or when braking power is being recuperated.

3. The accessory drive system of claim 2, wherein the storage device is a battery.

4. The accessory drive system of claim 3, wherein the selectively engageable torque transmitting device is a clutch.

5. The accessory drive system of claim 4, wherein the clutch is controllable to transfer enough energy to ensure the accessory is powered to remain fully operational without sacrificing driver demands pertaining to vehicle output.

6. An accessory drive system for a parallel electric hybrid vehicle comprising:
    an engine including a plurality of intake valves, a plurality of exhaust valves, and a crankshaft;
    a motor/generator independently connectable to a transmission;
    a storage device operatively connected to the motor/generator, said storage device being configured to store energy from the motor/generator when the engine is producing excess power or when braking power is being recuperated;
    a first selectively engageable torque transmitting device disposed between the engine and the transmission;
    a second selectively engageable torque transmitting device disposed between the motor/generator and the transmission, wherein said second torque transmitting device is disengageable to de-couple the motor/generator from the transmission;
    a drive pulley connected to the engine;
    a plurality of driven pulleys each of which is connected to one of a plurality of accessories;
    a drive belt operatively connecting said drive pulley and said plurality of driven pulleys and operable to transfer drive forces between said drive pulley and said plurality of driven pulleys;
    a controller operatively connected to the torque-transmitting devices, the engine and the motor/generator, said controller configured to control the torque-transmitting devices, the engine and the motor/generator to ensure that said plurality of accessories are sufficiently powered to remain fully operational by transferring energy from one of the engine and the motor/generator to ensure that the speed at which the accessories are driven does not fall below a predefined minimum speed; and
    wherein the controller is configurable to manipulate the intake valves and the exhaust valves when the accessories are being driven by power from the motor/generator through the engine crankshaft, in order to reduce crankshaft rotational resistance and engine pumping losses, and thereby improve the efficiency of the accessory drive system.

7. The accessory drive system of claim 6, wherein the storage device is a battery.

8. The accessory drive system of claim 7, wherein the first and second selectively engageable torque transmitting devices are clutches.

9. The accessory drive system of claim 8, wherein the first and second clutches are controllable to transfer enough energy to ensure the accessories are powered to remain fully operational without sacrificing driver demands pertaining to vehicle output.

10. The accessory drive system of claim 6, wherein the first selectively engageable torque transmitting device is also disposed between the engine and the motor/generator, and engageable to couple the motor/generator to the drive pulley.

11. The accessory drive system of claim 10, wherein the first selectively engageable torque transmitting device is disengageable to de-couple the engine from both the motor/generator and the transmission.

12. A method for operating an accessory drive system of a parallel electric hybrid vehicle comprising:
    providing an engine and a motor/generator independently connectable to a transmission;
    providing a first selectively engageable torque transmitting device disposed between the engine and the transmission, and a second selectively engageable torque transmitting device disposed between the motor/generator and the transmission;
    transferring energy from one of the engine and the motor/generator to a plurality of accessories;

establishing a predefined minimum speed at which all of said plurality of accessories must be driven in order to remain fully operational;

controlling the transfer of energy from the engine and the motor/generator to ensure that the speed at which the accessories are driven does not fall below the predefined minimum speed; and manipulating a plurality of intake valves and exhaust valves of the engine when the accessories are being driven by power from the motor/generator through an engine crankshaft, in order to reduce crankshaft rotational resistance and engine pumping losses, and thereby improve the efficiency of the accessory drive system.

13. The method of claim 12, further comprising controlling said first and second selectively engageable torque transmitting devices to transfer enough energy to ensure the accessories are adequately powered without sacrificing driver demands pertaining to vehicle output.

14. The method of claim 12, further comprising storing energy from the motor/generator in a battery when excess power is being produced by the engine or when braking power is being recuperated.

15. An accessory drive system for an hybrid electric vehicle comprising:

an engine and a motor/generator independently connectable to a transmission, wherein the engine includes a plurality of intake valves, a plurality of exhaust valves, and a crankshaft;

a selectively engageable torque transmitting device disposed between the engine and the transmission, wherein said torque transmitting device is disengageable to decouple the engine and the motor/generator from the transmission;

a drive pulley connected to the engine;

a driven pulley connected to an accessory;

a drive belt operatively connecting said drive pulley and said driven pulley and operable to transfer drive forces between said drive pulley and said driven pulley; and a controller operatively connected to the torque-transmitting device, the engine and the motor/generator, said controller configured to control the torque-transmitting device, the engine and the motor/generator to ensure that the accessory is sufficiently powered to remain fully operational by the engine when the engine is running or by said motor/generator when the engine is not running;

wherein the controller is configurable to manipulate the intake valves and the exhaust valves when the accessory is being driven by power from the motor/generator through the engine crankshaft, in order to reduce crankshaft rotational resistance and engine pumping losses, and thereby improve the efficiency of the accessory drive system.

* * * * *